Figure 1:
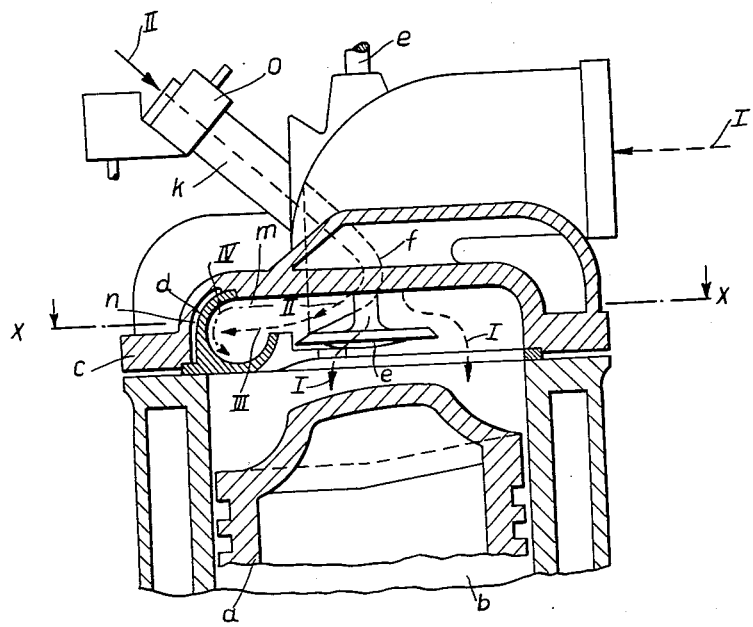

Jan. 2, 1962 F. STÜMPFIG ETAL 3,015,321
INTERNAL COMBUSTION ENGINE AND METHOD FOR OPERATING SAME
Filed March 2, 1959

Inventors
FRIEDRICH STÜMPFIG
AND KURT BELLWINKEL
BY Robert H Jacot
AGENT

“3,015,321
Patented Jan. 2, 1962

3,015,321
INTERNAL COMBUSTION ENGINE AND METHOD
FOR OPERATING SAME
Friedrich Stümpfig, Bismarckstrasse 31, and Curt Bellwinkel, Thornerstrasse 8, both of Nurnberg, Germany
Filed Mar. 2, 1959, Ser. No. 796,382
Claims priority, application Germany Mar. 4, 1958
10 Claims. (Cl. 123—30)

For internal combustion engines which are ignited by external means as well as self-igniting, it has already been proposed in order to obtain a low fuel consumption and to make possible the use of fuels having high as well as low boiling points, as well as high and low octane numbers and where pure air is introduced into the cylinder space, that the fuel is introduced as a mixture or as a vaporized fuel jet into an evaporation chamber which is in communication with the cylinder space and wherein it is diverted upon an arcuate hot wall surface, precipitated and vaporized, while during the compression stroke the air from the cylinder space is compressed partly within the vaporizing chamber and for another substantial part outside the same in an air compression space.

In this known engine provisions had been made heretofore that in order to obtain combustion without knocking and to prevent premature self-ignition a rich mixture is produced in the vaporizing chamber up to ignition and is then ignited therein, i.e. that the engine is operated with full air intake only when operating at full load but with heavy choking of the air intake while operating with a partial load.

This manner of operation is not yet satisfactory when operating with a partial load. In that case an undesirable decrease occurs in the amount of compression as well as a less complete combustion, particularly in the evaporation chamber, so that, on the one hand, the fuel consumption cannot be lowered to the smallest possible amount and, on the other hand, the contents of poisonous carbon monoxide in the exhaust gases does not become sufficiently low in order to keep down the poisoning effect on the air in cities at the lowest possible level. Known machines having an evaporation chamber are subject to the further disadvantage that in the region of partial load operation, on the one hand, in case of compression ignition, ignition may not take place, and, on the other hand, it is possible during the intake of fuel mixture into the evaporation chamber during the intake stroke essential quantities of fuel can be drawn from the combustion chamber into the cylinder space without being vaporized first, which also leads to less complete combustion.

In accordance with the present invention the shortcomings of combustion engines operating and equipped with vaporizing chambers are eliminated in that the preheating of the combustion chamber wall as well as the intake of air into the cylinder space and the fuel injection or introduction of mixture into the vaporizing chamber are effected or controlled in such a manner that, even with a partial engine load in case spark plug ignition an ignitable mixture is formed in the vaporizng chamber, and in case of compression ignition the ignition temperature is achieved in the vaporizing chamber.

In order to achieve this manner of operation the wall of the evaporation chamber is maintained so hot or is so over-heated that during the intake stroke with machine running at full load more fuel is preferably vaporized than what the vaporizing chamber can accommodate, so that some fuel vapor with or without finest fuel particles is drawn into the cylinder space and there forms the aforementioned lean mixture with the drawn in pure air. Now if, when operating with partial load in accordance with the invention the air intake into the cylinder space is not heavily choked or is not choked at all, i.e. the operation is with a considerable excess of air, the mixture in the vaporizing chamber remains nevertheless ignitable and favorable for combustion, because on the one hand due to the high heating of the wall of the vaporizing chamber, a heavy fuel vaporization takes place up to ignition, and because on the other hand, due to the great air intake into the cylinder space the drawing off of fuel from the vaporizing chamber into the cylinder space during the intake stroke is greatly reduced or entirely avoided.

For a further improvement of the operating method in accordance with the invention, it is desirable in the area of partial load when the fuel injection is used to undertake such injection only during the second half of the intake stroke or only during the compression stroke, and with fuel mixture suction to choke the same more or less during decreasing engine load by means of a control device and, at the same time, to keep the amount of air intake into the cylinder space either unchanged or to increase the same.

The new manner of operation is made possible by the surprising phenomenon that even with heating or overheating of the wall of the vaporizing chamber to a temperature which is far above the ignition temperature of the liquid fuel, premature ignition of the fuel or of the fuel vapor neither takes place in the idle running range nor in the region of the operating speed of the engine. It is believed that this condition is due to the heavy turbulence of the mixture in the vaporizing chamber and due to the fact that fuel in vapor or gas form has a higher ignition temperature than in liquid form.

Advantages of this new manner of operation are obtained also in connection with full load operation in the form of an increase of the engine efficiency as well as a further decrease in the fuel consumption, and with partial load operation a particularly great decrease of the fuel consumption, as well as a very heavy decrease of the contents of poisonous carbon monoxide in the exhaust gases which is of greatest significance for the purification of city air.

Figure 2:
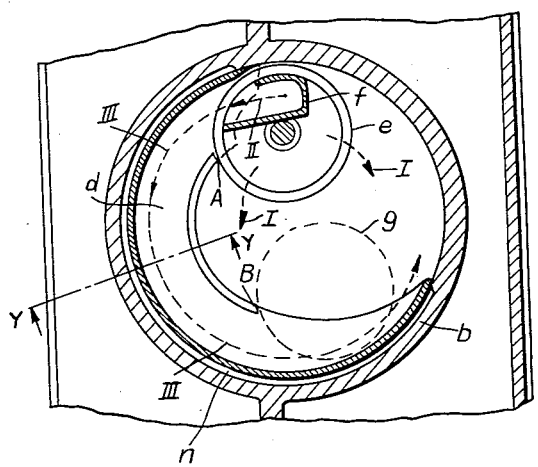
Figure 3:
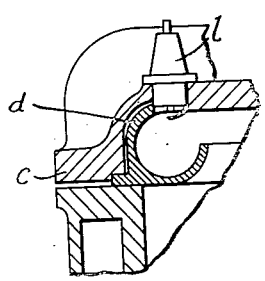

The method of operation in accordance with the invention can be used not only in the known combustion engines of the type operating with vaporizing chambers and air compression chambers suitably arranged, but also in corresponding structurally simpler arrangements of the invention as will be seen from the following embodiment from which further details and objects of the invention will become apparent. In the drawings:

FIG. 1 is a longitudinal section through the cylinder head and the upper part of the cylinder and through the piston of a four cycle internal combustion engine, FIG. 2 is a cross section along line XX of FIG. 1, and FIG. 3 is a cross section taken along line Y—Y in FIG. 2.

An air inlet valve $e$ shown in open condition as well as an exhaust valve $g$ indicated only as to its position merely in broken lines is provided in the cylinder head $c$. The former is rigidly connected with a shell valve $f$ for drawing in a fuel-air mixture so that during the intake stroke and the downward movement of the piston $a$ air is drawn into the cylinder $b$ through the open air inlet valve $e$ in the direction of the arrow I downwardly into the cylinder space and a fuel-air mixture prepared as may be required is drawn in through the mixture duct $k$ and the shell valve $f$ in the direction of the arrow II into the pocket like vaporizing chamber $d$ and the mixture is moved on in the vaporizing chamber along its arcuate wall which is not water cooled in the direction of the arrow III and is thereby changed in direction around the aperture $m$ of the vaporizing chamber into the cylinder space. During this occurrence the fuel particles which are contained in the mixture are cast out against the wall of the vaporizing chamber and precipitated thereon distributed in a large plane so that during the intake stroke they cannot reach the cylinder space at all, or only to a negligible extent.

Upon closing the inlet valve *e* the air from the cylinder space is compressed during the compression stroke partly outside of the vaporizing chamber *d* and partly within the same, while in the latter a transverse turbulence develops in the direction of arrow IV which brings about a good mixture of air and of the fuel which has meanwhile been more or less vaporized upon the hot wall of the vaporizing chamber. Shortly before termination of the compression stroke, there is a fuel vapor air mixture in the vaporizing chamber *d*, which with sufficiently high compression, is self-ignited or with somewhat less compression can be ignited by external means such as a spark plug *l*. Thereupon burning mixture flows in a heavy current from the vaporizing chamber into the air compressed externally thereof, admixes with the same under heavy turbulence and burns rapidly during the course of the mixing and without knocking even if the compression is above normal.

In order to attain on the one hand a timely complete vaporization of the fuel precipitated primarily in the proximity of the intake valve and upon the wall of the vaporizing chamber, and on the other hand to form the said mixing process outside the vaporizing chamber especially favorably, it is desirable to construct the bottom of the piston *a* in such a manner that for the uppermost piston position it is rather closely below the vaporizing chamber and extends along the inner edge A—B of the vaporizing chamber rather closely to the ceiling of the cylinder head leaving elsewhere between itself and the ceiling of the cylinder head at least below the inlet valve *e* an air compression space. Then there develops in the vaporizing chamber upon ignition a very powerful fire thrust blowing in the uppermost piston position primarily counter the direction of arrow III across the location of the main precipitation of the fuel and into the air compression space outside of the vaporizing chamber, which greatly accelerates the fuel vaporization and the commingling of the burning mixture with the total air and insures during the working stroke a complete timely combustion of the fuel also at high numbers of revolutions with extensive utilization of the combustion space and with fuels of high as well as low boiling point and any octane number. The exhausting of the gases of combustion takes place during the exhaust stroke by way of the exhaust valve which is located and operates in the area indicated in FIG. 2 by the circle *g*.

In order to raise the wall of the vaporizing chamber in operation to the high temperature necessary for the operating method in accordance with the invention, different means may be employed alone or together. Such means are, for example, the omission of a water cooling means along the wall of the vaporizing chamber, making the wall of the vaporizing chamber of porous sinter metals or the covering of the vaporizing chamber with a special wall which does not, or only partly touch the material of the cylinder head and partly projects into the combustion space. This wall may, among other things, be insulated by an air gap *n* against the material of the cylinder head.

It is also favorable, although not indispensable, to provide the mixture conduit *k* with a control device *o* in order to make possible with decreasing machine load cutting down more or less the drawing in of fuel from the vaporizing chamber into the cylinder space by decreasing the mixture intake so that a safe ignition is obtained in the vaporizing chamber even when the engine operates at partial load with great air excess. The control device *o* in accordance with FIG. 1 may be a conventional carburetor.

The engine described hereinabove which is adapted for external ignition or self-ignition can be modified considerably as to structural components. The fuel introduction into the vaporizing chamber may also be effected with other known means, for example, by a special mixture inlet valve or by injection at any time between the start of the suction stroke and the end of the compression stroke. It is also possible to provide the vaporizing chamber in the piston in a manner known per se, and generally the invention is applicable to four cycle engines as well as two cycle engines.

When the mixture injection into the vaporizing chamber and self-ignition are employed simultaneously, it is appropriate in order to avoid difficult ignition to maintain the heating of the wall of the vaporizing chamber so that up to the ignition there still remains a substantial quantity of unvaporized fuel upon the wall of the vaporizing chamber. The exit of some fuel vapor from the vaporizing chamber into the cylinder space during the suction stroke and with heavy loading of the engine is also here desirable because this improves the diesel combustion, particularly the smoke formation is essentially descreased or entirely avoided. To avoid that the self-ignition begins too soon as the engine becomes heated, the air intake into the cylinder space can be somewhat choked by means of a control device provided in the air intake duct as mentioned herein above and as illustrated at *o* in FIG. 1. In accordance with the invention, it is necessary in all cases that at least with the introduction of the fuel shortly before the ignition an additional air space is provided as a total compression space besides the vaporizing chamber, furthermore that the introduced fuel particles are precipitated upon a wall portion of the vaporizing chamber which is not water cooled, and besides that the fuel together with air is diverted around the connecting aperture to the air compression or cylinder space along the wall of the vaporizing chamber at least when being introduced during the intake stroke that in the event of external ignition at least in city traffic, the wall of the vaporizing chamber is kept so hot that up to ignition sufficient fuel is vaporized to permit also at partial engine load an air excess or sufficient air to prevent a substantial carbon monoxide formation during combustion.

Particularly the fact that the present invention provides the advantage of a very minor carbon monoxide formation during combustion is of greatest significance because the poisoning of the air in the cities by the high carbon monoxide content of the exhaust gases of the Otto motors most often used is very unhealthy and is apt in some instances to even have deathly effects, but which up to now could not be avoided because the customary diesel engines which exhaust less carbon monoxide are not generally applicable, on the one hand due to their heavy weight and their small engine efficiency, and on the other hand, because of the scarcity of diesel oils in the world market.

The embodiments described are not only distinguished by great simplicity, but beyond that also by great efficiency because the vaporizing chamber permits the wide exit opening which chokes the progress of the gas only negligibly which is still increased during the first downward movement of the piston for which reason very high numbers of rotation are used particularly since the fuel vaporization and the mixing of the fuel with air are favorably affected during the combustion of the ignition jolt with the piston in uppermost position.

Having now described our invention with reference to the embodiments shown, we do not wish to be limited thereto, but what we desire to protect by Letters Patent of the United States is set forth in the appended claims.

1. An internal combustion engine comprising a cylinder including a cylinder head and a piston in said cylinder, said cylinder head including an air compression chamber and a vaporizing chamber, and heat insulating means in the form of an air space or the like provided intermediate the wall of said cylinder head and said vaporizing chamber, said vaporizing chamber being formed of porous sinter metal.

2. An internal combustion engine comprising, in combination with a cylinder, combined means for air intake and fuel introduction and means for the exhaust of gases of combustion, a piston reciprocable in said cylinder and a cylinder head at one end of said cylinder, an air compression space and a vaporizing chamber in said cylinder head, said vaporizing chamber having an arcuate shape extending over less than 360° and being defined between a wall proximate said cylinder head and a bottom wall adjoining said air compression space and having apertures at two ends, said bottom wall having an edge spaced from said cylinder head and defining an elongated slot with the proximate portion of said cylinder head, said apertures and said slot leading into said air compression space, one of said apertures being defined proximate said combined means for air intake and fuel introduction and a spark plug extending into said vaporizing chamber between said two ends and being directed towards the wall of said chamber.

3. An internal combustion engine in accordance with claim 2, wherein said spark plug is disposed centrally of the two ends of said vaporizing chamber.

4. An internal combustion engine in accordance with claim 2, wherein the arcuate shape of said vaporizing chamber corresponds substantially to the curvature of the wall of the cylinder.

5. An internal combustion engine in accordance with claim 2, wherein said bottom wall of said vaporizing chamber defines a pocket in communication with the air compression space.

6. An internal combustion engine in accordance with claim 2, wherein said piston has an elevated portion adapted in the uppermost position of said piston to substantially cover said elongated slot.

7. An internal combustion engine in accordance with claim 2, wherein heat insulating means are provided intermediate said wall proximate said cylinder head and said cylinder head and said walls of said vaporizing chamber are of porous sinter material.

8. An internal combustion engine in accordance with claim 2, wherein a heat insulating air space is defined intermediate said wall proximate said cylinder head and said cylinder head and said walls of said vaporizing chamber are of porous sinter material.

9. Method of operating an internal combustion engine comprising the steps of introducing air into the cylinder space, supplying fuel from an intake to a vaporizing chamber and distributing, precipitating and vaporizing the fuel from the proximity of the intake over a hot wall portion of the vaporizing chamber, and introducing fuel during the intake stroke along an arcuate path into the cylinder space, compressing a part of the air from the cylinder space in the vaporizing chamber and a substantial other part in an air compression space which is in wide open communication with the vaporizing space while locally crowding the fuel vapor formed prior to the ignition primarily around the ignition means, igniting the fuel-vapor and air mixture in the vaporizing chamber towards the end of the compression, and then with the piston in its uppermost position closing a part of the open space between the vaporizing chamber and the air compression space by means of the piston and propagating the flaming mixture from the closed part of the vaporizing chamber directly over the precipitation area of the fuel in the vaporizing chamber and through the open part of the vaporizing chamber into the air compression space.

10. The method in accordance with claim 9 whereby the firestream coming from the ignition means is passed in the form of a thin sheet over the fuel precipitation area.

References Cited in the file of this patent
UNITED STATES PATENTS

| | | |
|---|---|---|
| 1,691,182 | Davol | Nov. 13, 1928 |
| 1,954,644 | Oberhaensli | Apr. 10, 1934 |
| 2,200,359 | Hellemn | May 14, 1940 |
| 2,720,870 | Grob | Oct. 18, 1955 |
| 2,799,257 | Stumpfig et al. | July 16, 1957 |
| 2,832,325 | Liebel | Apr. 29, 1958 |